Sept. 1, 1953  G. A. LYON  2,650,862
WHEEL COVER
Filed Oct. 12, 1948  2 Sheets-Sheet 2

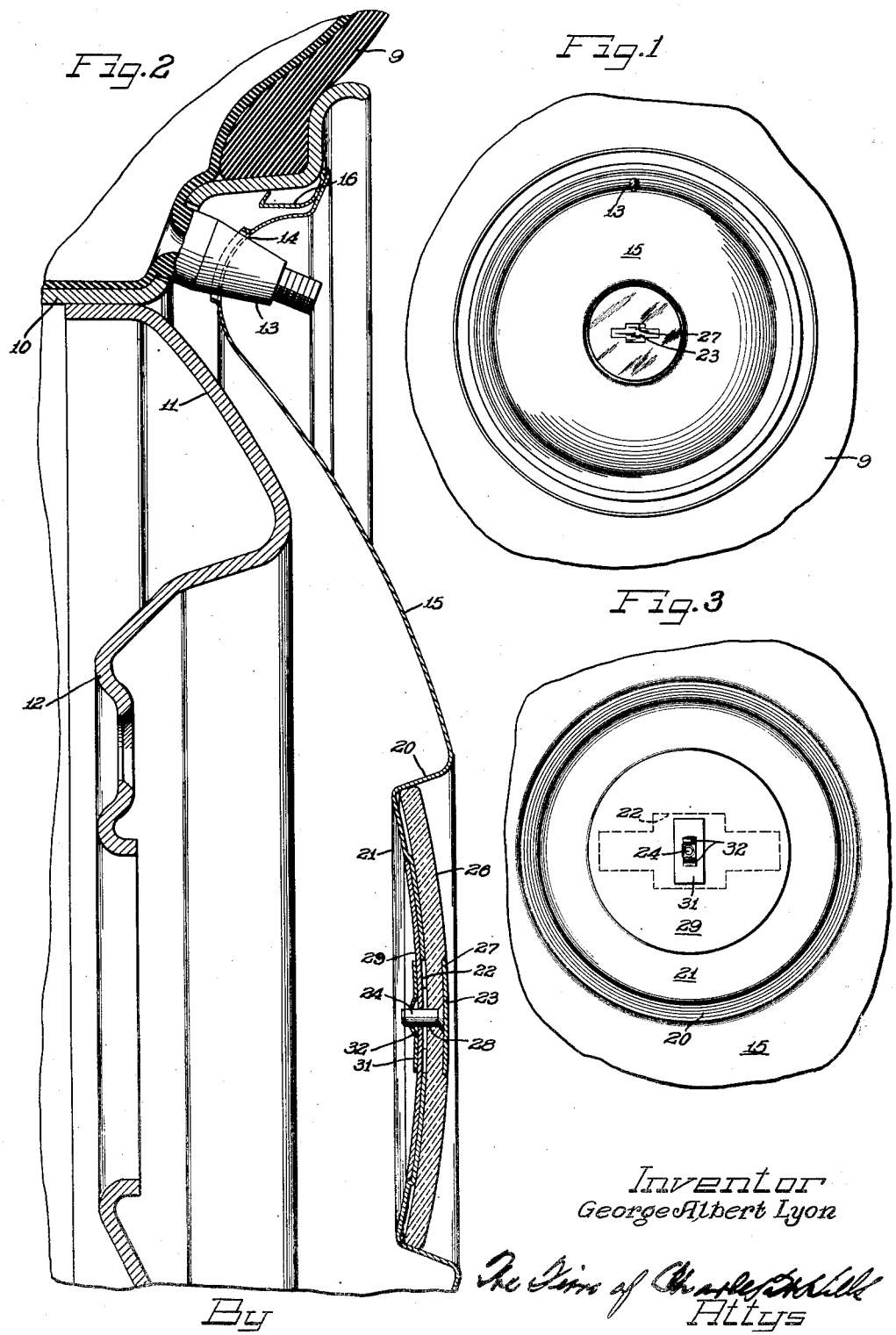

Inventor
George Albert Lyon
By The Firm of Charles H. Liff
Attys

Patented Sept. 1, 1953

2,650,862

UNITED STATES PATENT OFFICE 2,650,862

WHEEL COVER

George Albert Lyon, Detroit, Mich.

Application October 12, 1948, Serial No. 54,161

7 Claims. (Cl. 301—37)

This invention relates to ornamental structures and more particularly to an ornamental assembly for use on an automobile wheel cover.

An object of this invention is to provide an improved ornamental device which is easy to manufacture and assemble and which can be used to advantage in a wheel cover of an automobile.

Another object of this invention is to provide an ornamental reflector device including a reflector glass with novel means for supporting and holding the reflector glass in position.

Another object of this invention is to provide a simplified structure for ornamenting the center of a reflector glass such as is commonly used on automobiles as a safety medium.

In accordance with the general features of this invention there is provided in a structure of the above-described character a cupped member having the bottom thereof apertured, a reflector member in the cupped member resting on the bottom thereof and having an aperture therein, an ornamental insert member seated on the reflector member and fastening means connected to the insert member and extending through apertures in the cupped and reflector members for tightly fastening all of the members together in a unitary assembly.

Another feature of the invention relates to the forming of the insert member out of material punched from the supporting or cupped member in the forming of the central aperture therein.

Still another feature of the invention relates to the provision of fastening means for holding the members of the assembly together which fastening means includes a central stud on the outer ornamental insert and resilient tang or finger means on the rear side of the cupped supporting member for tightly gripping the surface of the stud member to hold it in place.

Other objects and features of this invention will more fully appear from the following detailed description taken in connection with the accompanying drawings which illustrate a single embodiment thereof and in which:

Figure 1 is a fragmentary side view of a wheel cover structure having the ornamental device of my invention;

Figure 2 is an enlarged fragmentary cross-sectional view taken through the cover of Figure 1 and showing the cover applied to a conventional wheel assembly;

Figure 3 is a fragmentary rear view of the central portion of the wheel cover shown in Figure 2 and showing the fastening means for the ornamental device of my invention;

As shown on the drawings:

Figure 4:
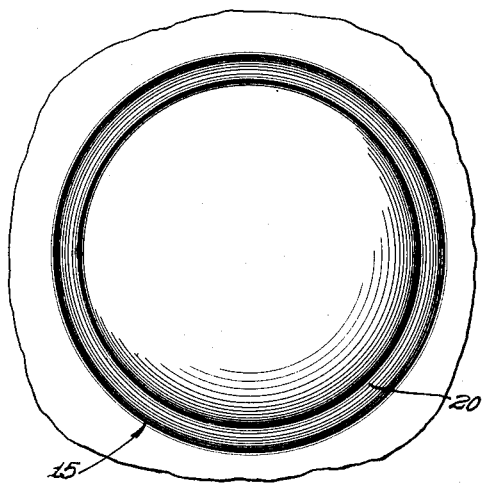
Figure 4 is a fragmentary side view of the central cupped portion of my cover showing the condition of the same prior to the blanking of the central aperture therein.

In Figure 2 I have more or less illustrated a conventional wheel of the type now used on the modern automobile. The reference character 9 designates generally a pneumatic tire and tube assembly mounted in the usual way upon a multi-flanged drop center type of tire rim 10. This rim is carried upon a dished body part 11 including the usual central bolt-on flange 12 by means of which the wheel may be detachably fastened or bolted to a part on an axle of an automobile. The wheel also includes the usual valve stem 13 by means of which the pneumatic tube can be inflated.

Cooperable with this wheel is a cover 15 having embodied therein an ornamental central device embracing the features of this invention. This cover 15 comprises a metallic stamping and has an aperture 14 through which the valve stem 13 extends so as to be accessible from the exterior of the cover without necessitating removal of the cover.

Also the cover 15 may be provided with any suitable means for detachably holding it on the wheel such, for example, as a plurality of spring fingers disposed about the peripheral margin of the cover and arranged to yieldably grip a flange of the tire rim. This type of retaining means is broadly shown in numerous patents that have heretofore been granted to me and has also been used in commercial structures now on the market.

The cover is easily applicable to the wheel by first aligning the hole 14 with the valve stem and by thereafter pushing it axially into the wheel until the fingers 16 resiliently tightly grip the flange of the tire rim. Likewise the cover may be easily removed from the wheel by merely inserting a pry-off tool under its outer peripheral edge and forcibly ejecting it from its retained cooperation with the rim of the wheel.

It is to be understood that while my ornamental assembly or composite article of manufacture may be used with advantage for ornamenting the central part of a wheel cover, the invention has other applications wherever ornamentation is desired or wherever a light reflector is to be used. It is, of course, well known in the automobile art that light reflectors have been used in hub caps, in lamps, bumpers, etc. Also light reflectors have been used on traffic signs, railroad crossing guards and other places where it is desired to reflect artificial light as a warning and for safety reasons.

Figure 6:
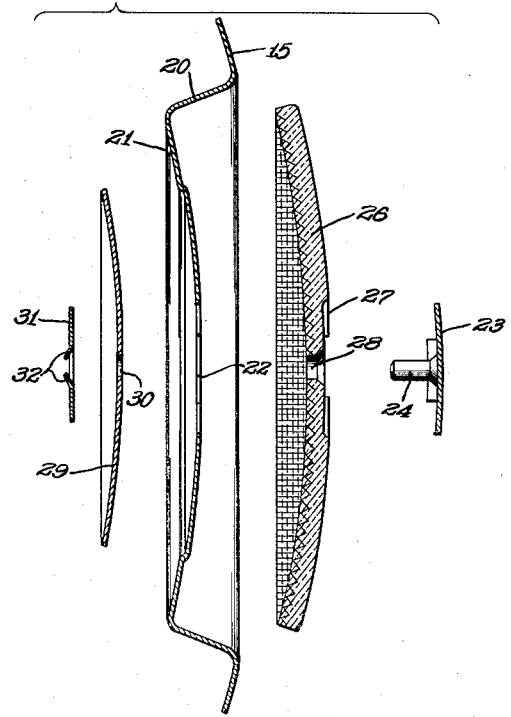
Figure 6 is an exploded view showing the various members going to make up my ornamental device at the center of the cover.

Referring first to Figure 2, it will be perceived that the central portion of the cover is formed into a dished or cupped member 20 which is the supporting member of my safety device. The various members or elements going to make up this assembly are shown in an exploded condition in Figure 6, to which I shall now refer.

Figure 7:
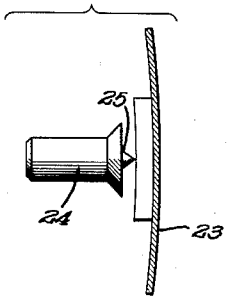
Figure 7 is an exploded view of the outer ornamental insert showing the fastening stud in a position to be fastened thereto.

The cupped portion 20 has a slightly bowed or convex bottom 21 provided with a central aperture 22 which will be alluded to more in detail hereinafter. It should be noted, however, at this time that the portion of material cut out of the aperture 22 comprises the ornamental outer insert 23 in the form of a retainer piece or plate which has integrally secured to it a central fastening stud 24. As best shown in Figure 7, the insert 23 is adapted to have the stud fastening element 24 secured to it by welding a point 25 to the insert 23. Any suitable projection welding equipment may be employed for permanently affixing point 25 in the material of the insert or plate 23.

While I have illustrated the ornamental insert 23 as being in the shape of a cross, symbolical of a car emblem, it could, of course, be made of any other desirable shape consistent with the type of ornamentation desired.

Another and very important member of my composite article or assembly is the glass reflector plate 26 which is of an arched convex-concave cross sectional shape. This reflector may be made of any suitable or well known type of reflecting material on the market such, for example, as red glass or glass with a phosphorescent material therein.

The central portion of this arched glass reflector is formed with a depression 27 conforming in shape to the shape of the ornamental insert 23 so that the insert may be seated in this depression and be substantially flush with the outer surface of the reflector.

In addition, the center of the reflector is provided with a hole 28 of a size to accommodate the stud 24 when the same is extended therethrough.

Now in order to fasten the insert, reflector and cupped portion 20 together, I provide fastening means at the under or rear side of the bottom of the cupped portion 20. This means includes a relatively large convex plate 29 of a configuration such as to enable it to nest or seat inside of the arched bottom 21 of the cupped portion. It is also centrally apertured at 30 to accommodate the stud 24. This plate is provided to cover the relatively large aperture 22 at the rear side of the ornamental device and so that a clamping plate 31 can cooperate with the stud in retaining the parts together. This clamping plate or disk 31 is centrally apertured and provided with diametrically opposite spring fingers or tangs 32 for resiliently and tightly gripping the surface of the stud 24 after the same has been pushed through the members of the assembly with the insert 23 seated in the depression 27. The final assembled form of the device is shown clearly in cross section in Figure 2.

Obviously, when the parts are assembled as shown in Figure 2, the spring fingers or tangs 32 will tightly grip the surface of the stud 24 and by reason of their rearward inclination will resist any tendency of the stud pulling out of the apertures in the members.

Figure 5:
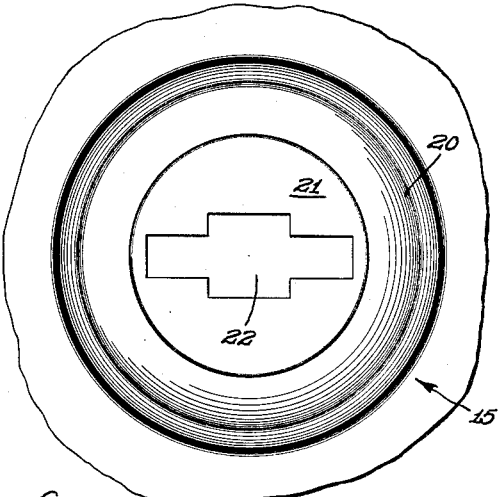
Figure 5 is a view similar to Figure 4 showing the condition of the central portion of the cupped part of my cover after the blanking of the aperture therein.

In the manufacture of this device, the cover 15 or supporting member for the device is first centrally blanked in a suitable press so as to provide the indented cupped portion 20 as shown in Figure 4. Thereafter the center portion of this cupped part is subjected to a further press operation to arch the bottom 21 and to provide the aperture 22 as shown in Figure 5. As noted before, the shape of the aperture 22 depends upon the ornamental shape of the insert 23 desired. I find that by using the material at the center of the cover for the making of the insert I am enabled to effect a considerable savings. The reason for this is that in the polishing and buffing of the outer surface of the cover 15 no additional expense is required to buff the center portion of the same. Hence, when the insert 23 is cut from the center portion of the cover, it will already be in polished condition ready to be used. I have attained excellent results by making the cover 15 of stainless steel which lends itself to a high lustrous finish upon polishing and buffing. However, the cover 15 could be made of other sheet steel suitably polished and buffed and later chromium plated to give it high luster.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. As a composite article of manufacture a cupped member having the bottom thereof apertured, a reflector member in said cupped member resting on the bottom thereof and having an aperture therein, an ornamental insert member seated on said reflector member and fastening means connected to said insert member and extending through apertures in the cupped and reflector members for tightly fastening all of said members together in a unitary assembly, said insert member being formed of the same material as that of the cupped member and being in the form of a stamping removed from the cupped member in the forming of the aperture therein, said reflector member comprising a glass disk of convex-concave cross section with its outer peripheral margin seated tightly against said bottom of the cupped member.

2. In a wheel cover structure comprising a wheel covering body portion formed from sheet material and having a central cup-like depressed area, said depressed area having a retainer piece struck from the bottom thereof and leaving an aperture of substantial proportions in said bottom, said piece having a stud secured centrally thereto, a disc seated in said depressed portion and having an aperture therethrough registering with the aperture in said depressed portion bottom, said piece lying against the outer side of said disc and having the stud extending through said apertures, means on the inner side of said bottom bridging said apertures, and having said stud extending therethrough to the rear thereof, and retaining means engaging said last mentioned means and engaging said stud to hold the assembly together.

3. In a composite article of manufacture, a body member having a depression of generally cup-shape therein, said body member being made from sheet material, an aperture of substantial size in the bottom of the depression and the material struck out in forming said aperture comprising a plate of ornamental character, said plate having a stud secured to the back thereof, a light reflecting disc seated in said depression and having a central aperture of substantially smaller diameter than and registering with said aperture in the depression bottom, said stud extending through the apertures and being of smaller diameter than the aperture in the depressed bottom, and means bridging said depression bottom aperture at the side of the depressed bottom opposite to said disc and having means thereon on the side thereof opposite to said depressed bottom retainingly engaging said stud.

4. In a composite article of manufacture, a body member having a depression of generally cup-shape therein, said body member being made from sheet material, an aperture of substantial size in the bottom of the depression and the material struck out from said aperture comprising a plate of ornamental character, said plate having a stud secured to the back thereof, a light reflecting disc seated in said depression and having a central aperture registering with said aperture in the depression bottom, said stud extending through the apertures, means bridging said depression bottom aperture and having means thereon retainingly engaging said stud, said depression bottom being outwardly arched and said aperture bridging means comprising a plate nesting in the side of said arched bottom opposite to that behind said disc.

5. In a vehicle wheel cover structure, a stamped circular sheet metal cover member having an outwardly bulging central crown and a marginal structure including means for attachment to a vehicle wheel, said crown having a cupped central depressed portion opening outwardly and the bottom of which is apertured, said depressed portion being defined by an annular wall, a disc of light reflecting structure in said depressed portion resting on the bottom thereof and with its edge encompassed by said annular wall, said disc having an aperture therein, an ornamental insert member seated on said disc, a fastening stud connected to said insert member and extending through the apertures in the depressed portion bottom and the disc, and means engaging and securing said stud at the inner side of said depressed portion bottom for tightly fastening said disc against displacement from said depressed portion.

6. In a wheel cover for disposition at the outer side of a vehicle wheel, a wheel cover body of substantial diameter formed from sheet material and having a generally convex dome crown portion, the central portion of said crown portion having a depressed area of generally cup-shape defined by a base wall and a circumscribing annular wall, a convexly crowned non-metallic disk seated in said depressed area close to said base wall and with its edge circumscribed by said annular wall, the depth of the depression being substantially greater than the thickness of said disk so that the latter is protectively depressed within the depression, said annular wall being substantially wider than the edge thickness of the disk and extending substantially axially outwardly beyond the outer margin of the disk and merging with the crown on an annular ridge which projects protectively substantially axially outwardly about the disk, and means securing the disk within the depression.

7. In a wheel cover, a cover body having a crowned central portion, said central portion having an aperture therein of substantial size, a disk closingly overlying said aperture, a plate lying against the back of the cover crown in substantially closing relation to said aperture and behind said disk, a member projecting from said disk through said aperture and through said plate, and a securing member of smaller size than said aperture and engaging said projecting member and said plate and clamping the disk and the plate against the intervening portion of the cover crown about said aperture.

GEORGE ALBERT LYON.

References Cited in the file of this patent

UNITED STATES PATENTS

| Number | Name | Date |
|---|---|---|
| Re. 22,428 | Lyon | Feb. 1, 1944 |
| 363,076 | Meerbott | May 17, 1887 |
| 1,603,392 | Lehr | Oct. 19, 1926 |
| 1,652,192 | Bamford | Dec. 13, 1927 |
| 1,851,128 | Rabinowitz | Mar. 29, 1932 |
| 2,118,746 | Tinnerman | May 24, 1938 |
| 2,392,633 | Bierman | Jan. 8, 1946 |